United States Patent [19]
Crabb

[11] Patent Number: 5,927,412
[45] Date of Patent: Jul. 27, 1999

[54] CASTERING SWING LINK FOR A TRACK SUB-ASSEMBLY

[75] Inventor: Elmer R. Crabb, Granbury, Tex.

[73] Assignee: Caterpillar Inc., Peoria, Ill.

[21] Appl. No.: 08/782,870

[22] Filed: Jan. 14, 1997

[51] Int. Cl.$^6$ ................................................ B62D 55/00
[52] U.S. Cl. .................... 180/9.44; 180/9.46; 305/116; 305/143
[58] Field of Search ..................... 180/9.1, 9.44, 180/9.46; 305/116, 143, 145, 125, 151, 152

[56] References Cited

U.S. PATENT DOCUMENTS

| | | | |
|---|---|---|---|
| 2,011,564 | 8/1935 | Barnes | 180/9.1 |
| 3,275,386 | 9/1966 | Bexten | 305/145 |
| 4,361,363 | 11/1982 | Livesay | 305/125 |
| 5,368,115 | 11/1994 | Crabb | 180/9.1 |
| 5,373,909 | 12/1994 | Dow et al. | 180/9.1 |

*Primary Examiner*—J J Swann
*Assistant Examiner*—David R. Dunn
*Attorney, Agent, or Firm*—Lawhorn, Simpson, Polsley

[57] ABSTRACT

Track sub-assembly having a castering swing link for supporting a primary idler spindle, the swing link having an upper bore for accepting a first connecting pin and a lower bore for accepting a second connecting pin to define a pivot line, and an offset idler bore offset from the pivot line permitting castering of the primary idler in response to externally imposed force vectors, with self-alignment of the primary idler to its proper tracking position.

17 Claims, 1 Drawing Sheet

U.S. Patent  Jul. 27, 1999  5,927,412
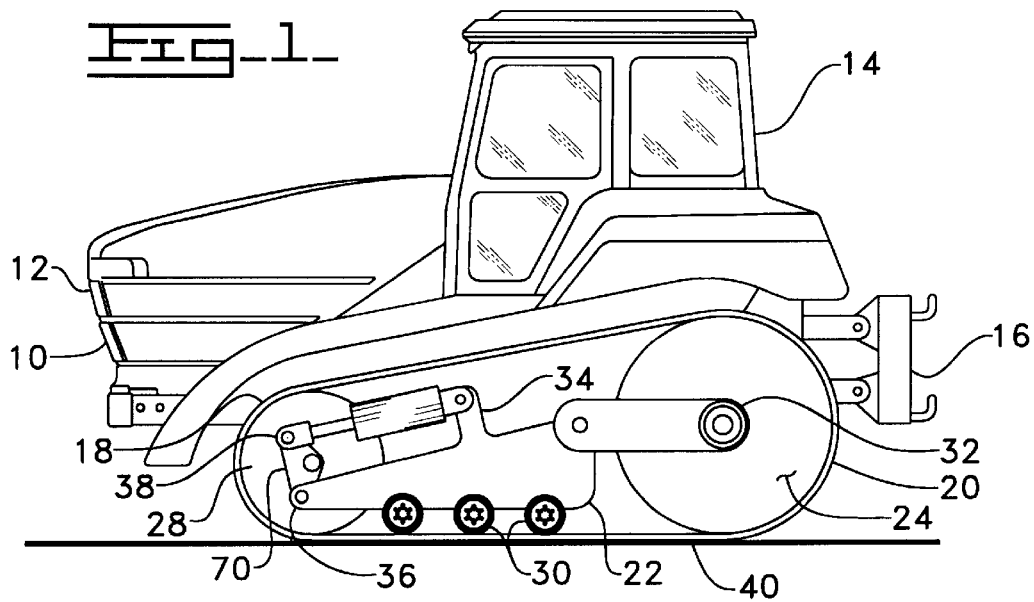
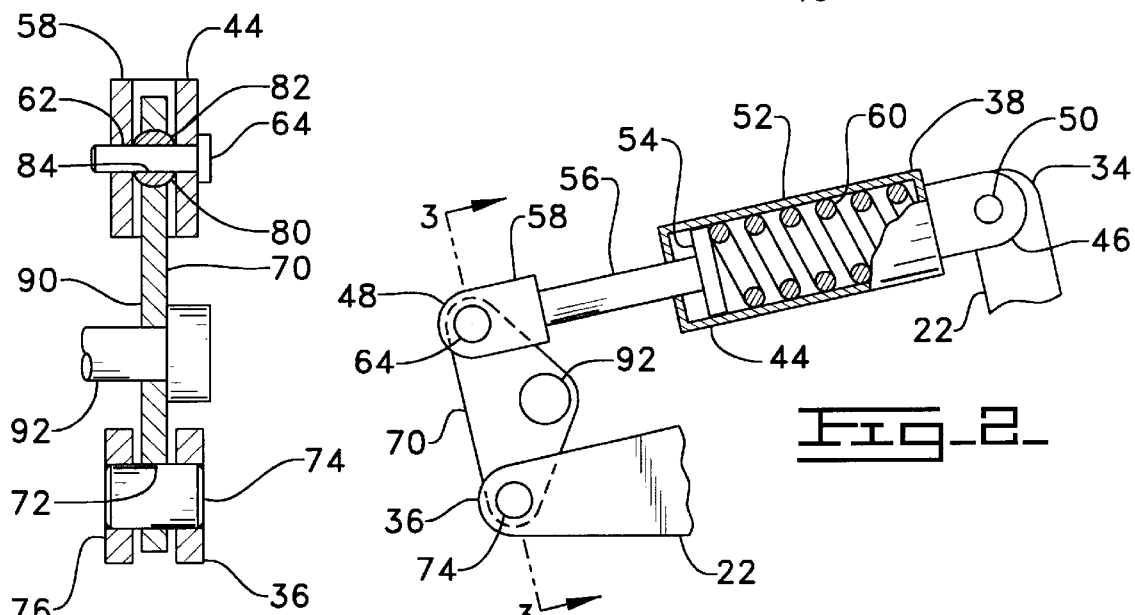
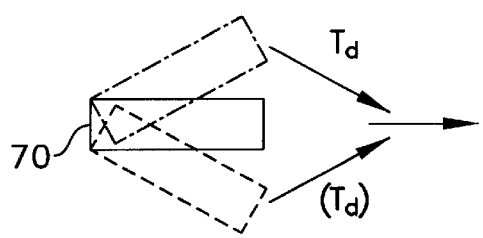
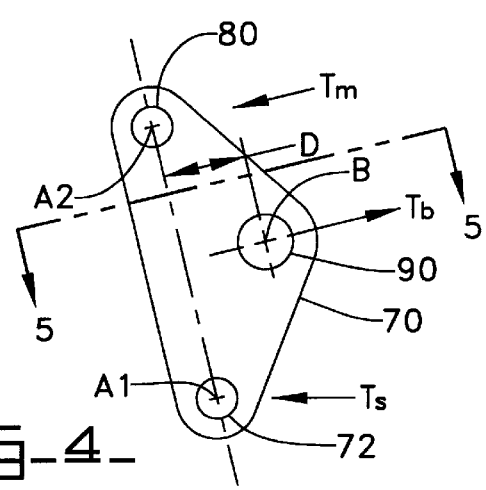

CASTERING SWING LINK FOR A TRACK SUB-ASSEMBLY

TECHNICAL FIELD

This invention pertains generally to tracktype work vehicles, and more particularly to the carriage assembly for use in a work vehicle having elastomeric track belts.

BACKGROUND ART

Work vehicles with endless elastomeric track belts have been successfully employed to perform various types of tasks in construction, earth-moving, and agricultural endeavors. As with metal chain type track assemblies, the endless elastomeric track belt equipped work vehicle typically includes a carriage assembly having at least one drive wheel and a plurality of roller wheels functioning as idler wheels for supporting and distributing the weight of the vehicle along the length of the track in ground contact. These roller assemblies typically include a relatively larger idler wheel at the end of the endless track loop opposite the drive wheel.

Work vehicles having such elastomeric endless track belts have been discovered to provide numerous advantages as compared to conventional metal track type work vehicles or wheel type work vehicles. For example, a work vehicle having such elastomeric track belts can be safely operated on conventional paved or asphalted road surfaces without causing damage thereto, thereby rendering unnecessary the need for disconnecting equipment and providing separate transport for both the work vehicle and its associated equipment when crossing or being transported on such roadways. Another advantage of such vehicles is reduced soil compaction and improved tractive effort per pound of vehicle weight as compared to conventional wheel type vehicles, which is especially beneficial when the work vehicle is employed in an agricultural endeavor. Also, such work vehicles offer additional advantages in terms of reduced weight and reduced costs of maintenance, especially as compared to conventional metal track type vehicles. One problem typically encountered in the use of the elastomeric track belt is the increased difficulty in assuring that the track belt remains properly centered on the drive wheel, roller wheel sub-assemblies, and idler wheel. The typical metal track type link can readily be provided with inwardly directed lugs which are relatively inflexible and generally satisfactorily assure that the track link will be suitably guided along the endless loop. However, the elastomeric track belt is substantially more flexible, and care must be taken in the design of such vehicles to compensate for this flexibility and assure that the elastomeric track belt will properly follow the designated loop path.

One earlier attempt to assure that the elastomeric track belt will properly follow the loop path is disclosed in U.S. Pat. No. 5,368,115, issued to Elmer R. Crabb on Nov. 29, 1994. This patent discloses a work vehicle having elastomeric track belts which operate on self-aligning roller idler wheels, to insure that the roller idlers disposed between the drive wheel and the idler wheel will remain aligned properly with the ground contacting portion of the elastomeric drive belt. The patent also discloses a self-contained tensioning means for insuring that the operating tension of the elastomeric track belt would be properly maintained during the operation of the work vehicle. Such a tensioning means permits the elastomeric track belt to have a degree of flexibility by permitting an increase or decrease in the length of the loop path and the ground contact portion during the operation of the work vehicle, thus decreasing the chance of a single point contact between the elastomeric track belt and the ground when operating on rough surfaces. However, it is also well known that during the operation of track equipped work vehicles, a substantial amount of lateral force may be exerted on the track belt during turning and other maneuvers as well as during sidehill operations. Just as misalignment with the roller idlers tends to cause excessive heat and wear of the elastomeric track belt, misalignment with the idler wheel also causes excessive heating and wearing of the track belt. This excessive heat and wear can cause premature failure of the elastomeric track belt, thus increasing the expense of maintenance and operation of a work vehicle so equipped.

Therefore, it is an object of the present invention to provide a means for insuring proper alignment of the elastomeric track belt with the idler wheel.

It is another object of the present invention to provide such an idler wheel self-alignment means as will be easily adapted to work vehicles.

It is yet another object of the present invention to provide such an idler wheel self-alignment means as will be relatively inexpensive to manufacture.

It is yet a further object of the present invention to provide such an idler wheel self-alignment means as will be relatively inexpensive to manufacture and to maintain.

It is yet a further object of the present invention to provide such an idler wheel self-alignment means as will cause reduced heating and wear of an elastomeric track belt when employed therewith.

It is another object of the present invention to provide such an idler wheel self-alignment means as will be responsive to lateral forces exerted upon the elastomeric track belt.

DISCLOSURE OF THE INVENTION

The subject invention includes an idler wheel mounting link having caster type mounts for engaging an undercarriage support member and an oppositely disposed tensioning means, together with a linearly displaced idler wheel mounting means therebetween, to ensure that the idler wheel may caster in response to misalignment of the elastomeric track belt.

BRIEF DESCRIPTION OF THE DRAWINGS

FIG. 1 discloses a tractor vehicle including the present invention.

FIG. 2 includes an enlarged partial view of the area of the undercarriage of the tractor vehicle according to FIG. 1, which includes the present invention.

FIG. 3 shows a front view of the partial undercarriage view according to FIG. 2.

FIG. 4 shows an undercarriage swing link according to the present invention.

FIG. 5 shows a top view of the undercarriage swing link as shown in FIG. 4.

BEST MODE FOR CARRYING OUT THE INVENTION

A tractor vehicle embodying the present invention and referred to by the reference number 10 is shown in FIG. 1. The tractor vehicle 10 includes a number of components and systems which do not comprise part of the subject invention but are well known to those skilled in the art, such as an engine housing 12 containing a prime mover such as a diesel engine and transmission sub-assembly and an operator station 14 such as a climate-controlled cab, as well as a hitch means 16, such as a three-point integral hitch for attaching work implements. While the features of the foregoing must be varied to suit the particulars of a given tractor type vehicle 10, these are not shown as it is believed that those skilled in the art are well able to understand and adapt these to any selected tractor vehicle within the realm of the present state of the art. A frame 18 is also provided below the operator's station 14 and the engine housing 12 to support both these and the apparatus contained therein, as well as to provide a place and means for mounting additional apparatus or other equipment employed in the task to which the tractor vehicle is set.

The tractor vehicle 10 also includes two track sub-assemblies 20 which are attached to the tractor frame 18 and disposed adjacent the engine housing 12 and operator station 14 on the left and right sides thereof along the direction of travel of the tractor vehicle 10. The left and right track sub-assemblies 20 are preferably substantially symmetrical, as is common in such tractor vehicles 10 to provide the proper balance and control thereof. Therefore, it will be understood that the discussion of the present invention as incorporated on the left-hand track sub-assembly 20 of the tractor vehicle 10 applies equally to the right-hand track sub-assembly 20 thereof without further specifically indicating the application thereof. The track sub-assembly 20 includes a longitudinal subframe 22 extending along the track sub-assembly 20 in the direction of travel thereof. This subframe 22 is also connected to the frame 18 to transfer weight from the tractor vehicle 10 to the subframe 22. At the rear of the track sub-assembly 20 is provided a relatively large diameter drive wheel 24 which is connected to the subframe 22 and also to the drive train of the tractor vehicle 10 for distribution of power to the track sub-assembly 20. At the front of the track sub-assembly 20 is provided a front idler 28 of a diameter relatively smaller than the diameter of the drive wheel 24. A plurality of load distributing rollers 30 are provided rotatably mounted on the subframe 22 between the front idler 28 and the rear drive wheel 24. These load distributing rollers 30 preferably have a smaller diameter than the diameter of the front roller 28, and are disposed on spindles secured to the underside of the subframe 22. The subframe 22 also includes a rearwardly extending connecting link 32 for connecting the subframe 22 with the spindle of the rear drive wheel 24 so as to provide improved structural integrity and stability of the track sub-assembly 20. Between the drive wheel 24 and the front idler 28, an upwardly extending tension means connecting link 34 is provided on the subframe 22. Between the tensioning means connecting arm 34 and the subframe forward end 36 is provided a tensioning sub-assembly 38 for connecting the front idler 28 to the track sub-assembly 20. An endless elastomeric ground-engaging drive belt or track belt 40 encircles the perimeter of the drive wheel 24, the front idler 28, and the load distributing rollers 30.

Turning to FIG. 2, the tensioning sub-assembly 38 is disclosed in greater detail. The tensioning sub-assembly 38 includes a tensioning means 44 having a tensioning means proximate end 46 and a tensioning means distal end 48. The tensioning means proximate end 46 is pivotally secured to the tensioning connecting arm 34 by way of a first connecting pin 50. The tensioning means 44 includes a tensioning means tubular body 52 adjacent the proximate end 46 in which a tensioning means plunger 54 is operably disposed for linear motion within the tensioning means body 52. A tensioning means connecting rod 56 operably connects the tensioning means plunger 54 to a tensioning means yoke 58 at the distal end 48 of the tensioning means 44. A coil spring 60 is disposed within the tensioning means body 52 between the tensioning means plunger 54 and the proximate end 46 so as to displace the plunger 54 linearly away from the proximate end 46. Those skilled in the art will appreciate the coil spring 60 is an exemplary means for displacing the plunger 54 as other well known means may be used as well. For example, a hydraulic jack and gas accumulator may be provided within the tensioning means body 52 to act upon the plunger 54 to cause the desired placement thereof. A transverse tensioning means yoke bore 62 is provided in the tensioning means yoke 58. An upper swing link pin 64 extends through the tensioning means yoke bore 62 to pivotally connect a swing link 70 to the tensioning means 44. The swing link 70 is provided with a lower first swing link bore 72 defined through the swing link 70 on a transverse axis A1. A second connecting pin 74 extends co-axially through the lower first swing link bore 72 and a subframe bore 76 defined in the subframe forward end 36 for pivotally connecting the swing link 70 to the subframe forward end 36.

As can be more particularly seen in FIGS. 3 and 4, the swing link 70 is provided with an upper second swing link bore 80 defined through the swing link 70 on a transverse axis A2 which is parallel to the axis A1. The second swing link bore 80 is spaced apart from the first swing link bore 72 to define a pivot line A1–A2. A spherical bearing body 82 is movably retained in the upper second swing link bore 80. The spherical bearing body 82 is capable of rotation in all three of the x-y-z axes of motion with respect to the swing spring link 70 and is provided with a centrally located swing link pin bore 84 for accepting the swing link pin 64 therethrough. The spherical bearing body 82 and the swing link pin 64 comprise a pivotal bearing means 82 permitting a relative freedom of motion of the swing link 70 with respect to the swing link pin 64 and the tensioning means yoke 58.

The swing link 70 also includes a transverse offset idler bore 90 on an axis B parallel to the axis A1 of the lower first swing link bore 72 and the axis A2 of the upper second swing link bore 80. The axis B of the offset idler bore 90 is disposed to the rear of pivot line A1–A2 between the axis of the lower swing link bore 72 and the upper swing link bore 80, as can be seen in FIG. 4. An idler spindle 92 is provided in the offset idler bore 90 upon which the primary idler 28 is rotatably mounted and supported. The detail of the securing means for rotatably mounting the front idler 28 to the idler spindle 92 is not disclosed for the reason that those skilled in the art are believed well acquainted with means for providing such rotatable mountings, such as use of roller bearings to provide a suitable mounting for retaining a hub to a spindle for supporting the front idler 28.

In operation, the pressure means or coil spring 60 acts upon the plunger 54 to urge the tensioning means yoke 58 away from the tensioning means proximate end 46, exerting a force Tm upon the swing link pin 64. This force Tm is then transferred through the spherical bearing body 82 to the swing link 70. Similarly, the subframe 22 is relatively incompressible, exerting a force Ts on the swing link 70 by way of the second connecting pin 74. The sum of these forces Tm and Ts is counterbalanced by a Force Tb acting on the swing link 70 through the idler spindle 92 by way of the front idler 28 which is constrained by the tension created within the elastomeric track belt 40. FIG. 4 also shows the offset distance D between the axis of the offset idler bore 90 and a line taken between the axis of the upper swing link bore 80 and the lower swing link bore 72.

FIG. 5 discloses more clearly the forces acting upon the swing link 70 during the operation of the tractor vehicle 10. The swing link 70 is seen in a cross-sectional view taken along Section line 5—5 of FIG. 4, with the force vectors Tb Tm and Ts disclosed thereon. In this condition, the swing link 70 is in the proper alignment, with the idler spindle 92 operating transversely to the subframe 22 to carry the elastomeric track belt 40. As indicated by the dotted lines in FIG. 5, the primary idler 28 has become misaligned with the direction of motion of the tractor vehicle 10, for example, due to skewing of the track sub-assembly 20, or the tracking of debris into the track sub-assembly 20 between the primary idler 28 and the elastomeric track belt 40. In this condition, the idler spindle 92 link 70 is pivoted and is not transverse with respect to the motion of the tractor vehicle 10. This misalignment causes the generation of a resultant force acting perpendicularly to the belt force Tb toward the center line of the swing link 70. The force operates through the offset distance D similarly to a force acting on a lever arm, to cause the front idler 28 to tend toward the transverse position. Therefore, as the obstructing, skewing, or other force causing the angular displacement of the idler the swing link 70 decreases, the front idler 28 will tend to caster with the idler spindle, 92 to the transverse position for proper operating of the track sub-assembly 20.

Numerous advantages accrue to the track sub-assembly 20 as a result of the incorporation of the castering swing link 70. For example, it is common for work vehicles such as the tractor vehicle 10 to be operated in environments where soil, rocks, or other debris can become temporarily enmeshed in the track sub-assembly 20. The castering capability of the swing link 70 according to the present invention permits the primary idler 28 to be displaced from its transverse operating position so that the debris can safely pass between the track belt 40 and the front idler 28 and exit the track sub-assembly 20, with the front idler 28 then castering on the swing link 70 to its normal transverse position for normal operation. Secondly, in the event that large skewing or side forces apply along the axis of the front idler 28, which would tend to cause misalignment of the elastomeric track belt 40 with the front idler 28, the primary idler 28 and the swing link 70 will caster from the normal transverse position to compensate for this skewing effect. This causes the track sub-assembly 20 to be substantially self-aligning, which in turn substantially reduces the maintenance requirement, since it is typically not necessary for the operator to stop the tractor vehicle 10 for the purpose of readjusting or realigning the track belt 40 on the track sub-assembly 20. In addition, the track belt self-alignment capability provided by the castering swing link 70 and front idler 28 substantially reduces the likelihood that the track sub-assembly 20 would lose the track, @ i.e., that the track belt 40 would become completely disengaged from the track sub-assembly 20, in that misalignment precursive to loss of the track belt 40 would be compensated for by the movement of the front idler 28. In addition, the inclusion of the spherical bearing body 82 in the tensioning sub-assembly 38 permits the swing link 70 to caster with a relatively high degree of freedom with respect to the tensioning means 44, ensuring that the operation of the tensioning sub-assembly 38 will be unaffected by the castering of the swing link 70 in response to misalignment between the primary idler 28 and the track belt 40, so that the proper tensioning action of the tensioning sub-assembly 38 is not compromised or reduced by the castering action of the swing link 70. In addition, the swing link 70 is relatively easy to manufacture and readily incorporated in the track sub-assembly 20 without requiring substantial modification thereof. Also, inclusion of the castering swing link 70 in the track sub-assembly 20 does not materially increase the number of components employed in the track sub-assembly 20 or the maintenance requirements thereof. Finally, the castering swing link 70 according to the present invention, being typically made of forged steel or similar materials, is highly durable and contributes to the improved longevity and useful life of the track sub-assembly 20.

Modifications to the preferred embodiment of the subject invention will be apparent to those skilled in the art within the scope of the claims that follow:

I claim:

1. A tensioning sub-assembly for use in a track sub-assembly, the tensioning sub-assembly comprised of:
    a tensioning means having a proximrate end connected to said track sub-assembly and a distal end hasving a tensioning means yoke having a transvrerse yoke bore therthrough;
    a castering swing link including a first swing link bore defined therethrough on an axis A1, and a spaced-apart second swing link bore defined threthrough on an axis A2, said axis A1 and axis A2 are parallel and define a pivot line A1-A2, said castering swing link further including an offset idler bore on an axis B, said axis B is parallel to said axis A1 and axis A2, and is offset from pivot line A1-A2 by an offset distance D;
    a pivotal bearing means having a spherical bearing body movably retained in said second swing link bore for pivotally connnecting said castering swing link and said distal end of said tensioning means.

2. A The tensioning sub-assembly as set forth in claim 1 wherein said spherical bearing body further includes a bearing bore defined therethrough.

3. The tensioning sub-assembly as set forth in claim 2 wherein said pivotal bearing means further includes a first swing link pin extending through said bearing bore and said yoke bore.

4. The tensioning sub-assembly as set forth in claim 3 wherein said tensioning means further includes a tensioning means plunger operating linearly in a tensioning means body to apply a force Tm to said castering sing link through said pivotal bearing means.

5. The tensioning sub-assembly as set forth in claim 4 wherein said tensioning means further includes a first connecting pin for pivotally connecting said proximate end to said track sub-assembly.

6. The tensioning sub-assembly as set forth in claim 5 wherein said tensioning means further includes a second connecting pin for pivotally connecting said castering swing link to said track sub-assembly.

7. A track sub-assembly for use in a work vehicle having an elastomeric ground-engaging track, said track sub-assembly comprised of:
    a subframe;
    a plurality of load distributing rollers rotatably mounted on said subframe;
    a drive wheel;
    a primary idler;
    endless elastomeric ground-engaging track belt extending around and engaging said load distributing rollers, said drive wheel, and said primary idler;
    a tensioning means, having a proximate end connected to said track sub-assembly and a distal end having a tensioning means yoke, having a transverse yoke bore therthrough;

a castering swing link including a first swing link bore defined therethrough on an axis A1, and a spaced-apart second swing link bore defined therethrough on an axis A2, said axis A1 and axis A2 are parallel and define a pivot line A1-A2, said castering swing link further including an offset idler bore on an axis B, said axis B is parallel to said axis A1 and axis A2, and is offset from pivot line A1-A2 by an offset distance D; and a pivotal hearing means having a spherical bearing body movably retained in said second swing link bore for pivotally connecting said castering swing link and said distal end of said tensioning means.

8. The track sub-assembly as set forth in claim 7 wherein said spherical bearing body further includes a bearing bore defined therethrough.

9. The track sub-assembly as set forth in claim 8 wherein said pivotal bearing means further includes a first swing link pin extending through said bearing bore and said yoke bore.

10. The track sub-assembly as set forth in claim 9 wherein said tensioning means further includes a tensioning means plunger operating linearly in a tensioning means body to apply a tension means force Tm to said castering swing link through said pivotal bearing means.

11. The track sub-assembly as set forth in claim 10 wherein said tensioning means further includes a first connecting pin extending through said subframe bore for pivotally connecting said proximate end to said subframe.

12. The track sub-assembly as set forth in claim 11 wherein said subframe further includes a subframe forward end having a subframe bore defined therethrough.

13. The track sub-assembly as set forth in claim 12 wherein said track sub-assembly further includes a second connecting pin for pivotally connecting said castering swing link to said track sub-assembly to exert a subframe force Ts on said castering swing link.

14. The track sub-assembly as set forth in claim 13 wherein said castering swing link further includes a idler spindle disposed in said offset idler bore, said idler spindle for rotatably mounting said primary idler to said track sub-assembly, said idler spindle further transferring a belt force Tb from said track belt and said primary idler to said castering swing link.

15. The track sub-assembly as set forth in claim 14 wherein said belt force Tb is opposite to and balanced by the sum of the subframe force Ts and the tension means force Tm.

16. The track sub-assembly as set forth in claim 14 wherein said castering swing link is skewed with respect to the subframe to generate a resultant force vector-Td acting through the offset distance D upon the castering swing link to cause self-alignment of the castering swing link to the track sub-assembly.

17. A tensioning sub-assembly for use in a track sub-assembly, the tensioning sub-assembly comprising:

a tensioning device having a proximate end connected to said track sub-assembly and a distal end;

a castering swing link including a first swing link bore defined therethrough on an axis A1, and a spaced-apart second swing link bore defined therethrough on an axis A2, and further including an offset idler bore on an axis B; and a pivotal bearing having a spherical bearing body movably retained in said second swing link bore for pivotally connecting said castering swing link and said distal end of said tensioning means.

\* \* \* \* \*

UNITED STATES PATENT AND TRADEMARK OFFICE
CERTIFICATE OF CORRECTION

PATENT NO. : 5,927,412
DATED : 7/27/99
INVENTOR(S) : Crabb

It is certified that error appears in the above-identified patent and that said Letters Patent is hereby corrected as shown below:

Column 6, line 17, delete "hasving" and insert -- having --

Column 6, line 18, delete "transvrerse" and insert -- transverse --

Column 6, line 19, delete "therthrough" and insert -- therethrough --

Column 6, line 22, delete "threthrough" and insert -- therethrough --

Column 6, line 32, delete "A" at the beginning of the sentence

Column 6, line 43, delete "sing" and insert -- swing --

Column 6, line 61, insert -- an -- before "endless"

Column 8, line 15, delete "vector Td"

Signed and Sealed this

Twenty-eighth Day of December, 1999

Attest:

Attesting Officer

Q. TODD DICKINSON

Acting Commissioner of Patents and Trademarks